United States Patent [19]

Eckels

[11] 4,238,701
[45] Dec. 9, 1980

[54] METHOD AND APPARATUS FOR OPERATING GENERATOR IN ITS SUPERCONDUCTING STATE

[75] Inventor: Phillip W. Eckels, Pittsburgh, Pa.

[73] Assignee: Electric Power Research Institute, Palo Alto, Calif.

[21] Appl. No.: 786,533

[22] Filed: Apr. 11, 1977

[51] Int. Cl.$^3$ .............................................. H02K 1/32
[52] U.S. Cl. ........................................ 310/64; 310/10
[58] Field of Search ...................... 310/64, 53, 59, 52, 310/40, 60, 10, 58, 61; 62/499; 335/216; 165/89

[56] References Cited

U.S. PATENT DOCUMENTS

| | | | |
|---|---|---|---|
| 3,471,726 | 10/1969 | Burnier | 310/54 |
| 3,596,120 | 7/1971 | Potter | 310/61 |
| 3,626,717 | 12/1971 | Lorch | 62/505 |
| 3,733,502 | 5/1973 | Curtis | 310/61 |
| 3,761,752 | 9/1973 | Anderson | 310/194 |
| 3,809,933 | 5/1974 | Sugawara | 310/10 |
| 3,891,875 | 6/1975 | Laskaris | 310/40 |
| 3,894,253 | 7/1975 | Willyoung | 310/61 |
| 4,037,124 | 7/1977 | Kullmann | 310/52 |
| 4,042,846 | 8/1977 | Sterrett | 310/52 |
| 4,063,122 | 12/1977 | Kullmann | 310/10 |
| 4,082,967 | 4/1978 | Laskaris | 310/10 |
| 4,123,677 | 10/1978 | Laskaris | 310/52 |

*Primary Examiner*—R. Skudy
*Attorney, Agent, or Firm*—Townsend and Townsend

[57] ABSTRACT

A superconducting generator or alternator in which the electrical winding is disposed within a fluid impervious outer shell. Liquid coolant is introduced into the interior of the shell via a liquid coolant supply pipe that terminates in an axially extending liquid coolant intake trough. The trough separates the incoming coolant from an annular coolant bath that submerges the electrical winding of the generator during superconducting operation. Heat conducting tubes extend radially outward from the bottom of the trough and permit a flow of liquid coolant therethrough to adjacent the outer shell. Sensible heat of compression (resulting from the rotation of the generator) produced in the coolant stream in the tube is at least partially withdrawn from the stream by the tubes and transferred to the inner surface of the bath so that the coolant is discharged from the tubes at a lesser temperature than would otherwise be the case. The discharged coolant is circulated past the electrical winding towards the inner surface of the annular coolant bath where it evaporates. The center of the generator is maintained at a vacuum and coolant vapor is withdrawn and circulated through a conventional refrigeration system for return in liquid form to a liquid coolant supply pipe which in turn flows the coolant back into the trough. A liquid coolant accumulator can be employed in the liquid coolant supply so that the coolant is maintained at a constant pressure. Variations in the coolant demand are self-regulated by corresponding variations in the depth of the coolant intake pool in the trough.

34 Claims, 2 Drawing Figures

METHOD AND APPARATUS FOR OPERATING GENERATOR IN ITS SUPERCONDUCTING STATE

ACKNOWLEDGMENT

This invention was made under contract with or supported by the Electric Power Research Institute, Inc. of Palo Alto, Calif.

BACKGROUND OF THE INVENTION

It is a well-known phenomenon that many metals, alloys and chemical compounds substantially lose all of their electrical resistance at temperatures near absolute zero. This phenomenon has highly advantageous applications when applied to electrical alternators or generators. To achieve the advantages resulting from superconductivity in the generator, and in particular, the electrical winding thereof, the winding must be operated below the critical temperature (above which the winding returns to its normal, resistive conducting state). The critical temperature itself is a function of conductor current density and magnetic field strength. In general, the lower the temperature, the greater the current density and magnetic field may be.

In the past, it has been proposed to operate generators in their superconducting mode by submerging them in a liquid helium pool to keep the temperature of the winding below its critical temperature.

Generally speaking, the construction of a generator or alternator for superconductive operation entails the provision of a generally cylindrical, gas-tight outer shell that rotates with the shaft of the rotor. The electrical winding (hereinafter "winding") is disposed interiorly of and spaced a slight distance inwardly from the shell. It too rotates with the shaft. A quantity of helium is placed inside the shell which is sufficient to fully submerge the winding in liquid helium when the generator rotates at its normal operating speed. At that point, the pool forms an inwardly facing liquid helium interface from which helium boils off into the gaseous center or core space of the rotor. Means must be provided to replenish the helium as it boils off and to keep the helium bath at a sufficiently low temperature so that the winding will remain below the critical temperature at all times.

Liquid helium is normally introduced into the shell interior via a central bore in one of the shafts. Helium vapor is normally withdrawn through a similar bore at either end of the rotor for recirculation through a conventional refrigeration system employing a compressor and a condenser.

A drawback of this type of construction is the fact that fresh liquid helium must constantly be transported radially outward towards the outer shell for cooling of the winding that is proximate the shell. Due to the relatively high rate of rotation of the shell, this entails a compression of the liquid helium which in turn raises its temperature. As a result, the temperature of the helium bath at the radially outermost point is higher than the temperature of the bath adjacent the helium bath interface. Yet, the lowest helium temperature is required in the area of the winding because it is the winding that must be kept below the critical temperature. Since the temperatures involved are very low, the critical temperature for a typical winding being normally in the vicinity of 4.5° K., even slight temperature increases in the order of a fraction of a degree are most undesirable because they can cause the winding to intermittently return to its normal, i.e. non-superconducting state. Thus, it is apparent that superconducting generators operating in a liquid helium pool are of questionable reliability and, in fact, it is believed that no such generators have ever been built on a commercial scale.

Generally speaking, Roebuck-type refrigeration systems are also known though not for cooling generator rotors below their critical temperature for reasons that will be set forth in greater detail below. Briefly, in a Roebuck refrigeration device a conduit for the liquid cooling medium, e.g. for liquid helium is rotated at a relatively high rate and is given a crank or horseshoe shape. The medium to be cooled enters from one end of the pipe and it is compressed by the centrifugal force acting on the medium as the medium travels along the lateral portion of the pipe. During the centrifugal compression of the medium, the medium is cooled from the exterior of the pipe to withdraw from the medium sensible heat of compression (resulting from the increased pressure acting on the medium as it travels radially outward). When the "cooled" medium returns radially inward on the second leg of the crank-shaped pipe, its pressure decreases, it expands and thereby cools to below the temperature at which it was when it entered the pipe. For a further discussion of the principal and operation of a Roebuck refrigeration device see *Cryogenic Engineering* by R. B. Scott, D. Van Nostrand Co. Inc., Princeton, N.J. 1967, pages 38 and 39.

Incorporating a Roebuck-type refrigeration device in the rotor of a superconducting generator or alternator has been thought not feasible for the simple reason that the electrical winding of the rotor must be cooled to such an extent that the winding must be submerged in the cooling medium, e.g. the liquid helium. Since the winding could not be placed in a rotating, horseshoe-shaped pipe, a Roebuck-type refrigeration device appears to be inapplicable to supercooled generators.

In addition, even if the winding of a rotor could be placed within the horseshoe-shaped conduit of a Roebuck device, the cooling efficiency of such a device would be relatively low because of coolant vapors that are entrained in the liquid coolant. Such vapors cannot be removed from a closed loop and adversely affect the efficiency with which the coolant can absorb heat from the winding.

A further drawback with proposed prior art cooling systems for the operation of a generator rotor in its superconducting state is the fact that it is necessary to operate the gaseous core space in the shell into which liquid helium evaporates at a relatively low pressure in order to attain the necessary low operating temperature. Normally, that pressure is the vapor pressure of the cooling medium which is less than the ambient pressure; for helium it is about one-half atmosphere. In such a case, the liquid helium must be supplied at a like pressure, resulting in a vacuum condition in the intake conduit which can readily lead to air inclusions in the helium flow due to air leaks in the system. If such inclusions occur, slush forms rapidly which adversely affects the cooling flow and which, under extreme circumstances, can lead to a blockage of passages and a breakdown of the cooling system. Needless to say, that would have catastrophic consequences for the operation of the generator.

SUMMARY OF THE INVENTION

The present invention is especially adapted for use in conjunction with a modified Roebuck-type refrigeration device employed for operating rotating members such as the above-discussed rotor of a generator operating in their superconducting state. In the context of the present invention, such a modified Roebuck-type device takes the form of a liquid helium supply tube which is axially brought into the rotor shell and which then extends radially outwardly from the axis. The tube is open adjacent the rotor shell so that helium is discharged from the tube at that point. A sufficient quantity of liquid helium is maintained in the shell to form a liquid helium bath which fully submerges the electrical winding of the rotor. Thus, in contrast to a conventional Roebuck-type device the modified Roebuck-type device employs only one radial pipe through which the liquid flows radially outward.

Due to the relatively high rate of rotation of the rotor the liquid helium travelling radially outwardly through the tube is compressed. Since at least the radially outer portion of the tube is submerged in the liquid helium bath of the rotor, sensible heat of compression generated in the coolant in the tube is transferred to the tube and flows in counterflow to the liquid motion direction to the surface of the liquid helium pool, thereby cooling the helium in the tube. As a consequence, the temperature of the liquid helium discharged adjacent the outer shell is lower than what it would otherwise be, and in particular, it is lower than what the temperature adjacent the shell would be in the prior art liquid helium pool-type rotor construction.

As the discharged liquid helium flows radially inward past the winding towards the helium bath interface its pressure becomes less and its depressurization cools the helium below the tube discharge temperature. Of course, any heat taken up by the helium from the winding will correspondingly raise the helium temperature. However, its absolute temperature will be less than what it would be in the prior art helium pool-type construction.

The present invention relates to the manner in which the flow rate for the coolant into and through the generator is controlled. It contemplates to divide the winding into a main bath which actually cools the winding and a secondary, volumetrically much smaller liquid helium supply or intake pool which forms part of a two-stage radial conduit of a Roebuck refrigeration device.

The secondary pool and the two-stage radial helium conduit perform a dual function. First, they serve to separate the gaseous phase from the liquid phase of the incoming helium flow before the helium is transmitted to the windings. Secondly, the secondary pool forms a flexible, internal liquid helium supply from which additional helium during helium demand surges can be instantaneously furnished to the main helium bath. The pool itself is quickly replenished because variations in the liquid level in the pool are employed to control the flow rate of incoming helium without requiring complicated, sensitive and fail-prone flow control sensors and devices.

A generator rotor for operation in its superconducting state constructed in accordance with the present invention generally comprises an electrical winding carried by a rotatable shaft, a fluid impervious shell surrounding the winding and a fluid pervious cage disposed interiorly of the winding, all being interconnected for synchronized rotation with the shaft. A plurality, e.g. two diametrically opposed, axially extending, fluid impervious and inwardly opening troughs are provided which, in use, will hold the liquid helium forming the above-discussed secondary helium pool. The troughs are thermally coupled with the earlier discussed cage and they have longitudinal sidewalls which project inwardly (towards the axis of rotation of the rotor) past the cage.

A quantity of liquid coolant is placed in the shell and is measured so that it submerges the cage in a liquid coolant bath but does not reach an innermost end of the trough sidewalls when the rotor operates at its normal operating rate of rotation (hereinafter sometimes "operating speed").

A plurality of axially spaced apart heat exchanger tubes constructed of a heavy walled, thermally conducting material extend radially from a bottom of the trough towards the outer shell. The tubes are thermally coupled with the trough, they are insulated on their outer cylindrical surface, and their free ends are positioned proximate the shell.

A liquid helium supply pipe extends coaxially through the shaft from the exterior of the shell to the interior thereof and connects to lateral helium supply conduits in fluid communication with the pipe and disposed interiorly of the shell. Free ends of the conduits are disposed a sufficient distance inside the troughs so that the ends are submerged in the helium pool formed in the trough during operation of the generator.

A refrigeration system for withdrawing helium vapor from an interior vapor core (formed by the cylindrical helium bath surface during rotation of the rotor), for condensing the vapor and for recirculating liquid helium to the supply pipe is also provided.

During operation the helium in the shell forms the above-discussed annular helium bath in which the winding is submerged. Helium constantly boils off as the bath cools the winding and helium vapor is withdrawn through the core space to the refrigeration system. Boiled off helium is refurbished with fresh liquid helium flowed into the secondary helium pool in the trough via the supply pipe and the lateral supply conduits. Helium discharged by the conduits into the troughs separates into a liquid phase, which remains in the trough due to the centrifugal forces acting thereon, and a vapor phase which collects in the core space radially inward of the liquid level in the supply pool.

From the supply pool liquid helium flows through the heat exchanger tubes radially outward for discharge in the vicinity of the outer shell. During its outward flow the helium is compressed and its temperature rises. For a typical construction in which the rotor operates at 3600 rpm and the outer tube ends rotate at an 11.5 inch radius the temperature rise of the helium due to its compression may be as much as 1° K. However, by constructing the tubes of a high grade thermal heat conducting material such as OFHC copper submerged in the surrounding liquid helium bath which, adjacent the vapor core (at a pressure of approximately one-half atmosphere) has a temperature in the vicinity of 3.5° K. the heat rise of the helium flowing radially outwardly through the tubes can be kept to as little as 0.1° K. Thus, liquid helium discharged at a radius of about 11.5 inches at 3600 rpm has a temperature of only about 3.6° K. instead of 4.5° to 4.6° K. (for a helium bath boiling off at the interface at about 3.5° K.). Since the critical temperature for many suitable windings is in the vicinity of about 4.5° K., this additional cooling of the helium reaching the winding provides a significant margin of safety which acts as a buffer to absorb heat surges in the winding resulting from momentary (e.g. 66 millisecond) high side transformer faults which can have an expected heat output of 11 kJ without exceeding the critical temperature for the winding.

As already discussed, the helium "rising" to the surface, that is flowing from adjacent the shell past the winding to the liquid bath interface surrounding the vapor core, experiences a further temperature reduction due to the decrease in the pressurization of the liquid. This temperature reduction is partially or wholly offset by heat absorption from the winding and during superconducting operation the liquid helium reaches the bath interface and boils off at about 3.5° K.

In addition to the just described superior cooling characteristics afforded by the present invention, and the initial separation of the gaseous helium from liquid helium in the secondary helium supply pool, the two-stage helium supply conduit together with the supply pool act as an automatic flow regulator for incoming helium. During normal, that is during equilibrium operation in which the outgoing vapor flow equals the incoming liquid and vapor helium flow, the fluid level in the secondary pool is roughly equal to the fluid level in the main helium bath. The radial supply conduits are sufficiently submerged in the intake pool so that the liquid helium in the pool forms a pressure head (generated by the centrifugal force action on the liquid in the pool) against which the incoming helium is discharged. Should the coolant demand suddenly surge due to an increased heat absorption from the winding caused by the above-mentioned momentary high side transformer default, for example, the amount of helium boil off increases rapidly, thereby lowering the bath level relative to the secondary helium pool level. This imbalance immediately causes a corresponding flow of additional helium through the heat transfer tubes into the bath until equilibrium is restored.

The resulting reduction in the liquid level in the secondary pool has the immediate effect of reducing the pressure head acting on the radial helium supply tubes which feed fresh helium into the troughs. The fresh helium is supplied at a constant, e.g. atmospheric pressure and the lowering of the liquid level in the trough thus causes a corresponding increase in the helium flow rate through the supply pipe and the radial conduit. As the liquid level in the trough rises the increasing effective pressure formed by the supply pool reduces the flow rate through the supply pipe and the conduit towards the equilibrium state.

From the foregoing it is apparent that the present invention provides a self-regulating, highly responsive and finely tuned liquid helium supply which does not need and does not rely on complicated and fail-prone sensors, control devices, valves, etc. As a result, the likelihood of failure of the cooling system and a corresponding failure of the generator is greatly reduced. At the same time the initial and operating costs for the refrigeration system of the generator are significantly reduced.

Another aspect of the present invention relates to the operation of the helium intake at no less than or at slightly above atmospheric pressure while the vapor core of the rotor operates at a pressure below atmospheric pressure, e.g. at the above-discussed one-half atmosphere. While below atmospheric operation of the vapor core facilitates the degree of cooling that is afforded by the present invention, the atmospheric or above atmospheric fluid intake is made possible by operation of the cooling system as a modified Roebuck refrigeration device. As a result, vacuum leaks, air entries and malfunctioning of the refrigeration system are prevented. Further, the helium supply can be operated at a constant, e.g. atmospheric pressure between the liquid helium pump and the liquid bath because of the flow regulating features obtained from operation of the secondary helium pool. Since no separate exterior flow controls are required, a liquid helium accumulator or storage can be employed from which liquid helium is flowed to the supply pipe and hence into the rotor shell. This has the advantage that the helium liquefier or refrigerator can operate independent of the instantaneous helium demand while helium demand surges are readily and substantially instantaneously accommodated. Again, this is a cost-saving feature provided by the present invention which also enhances the reliability of the cooling system.

DESCRIPTION OF THE PREFERRED EMBODIMENTS

Figure 1:
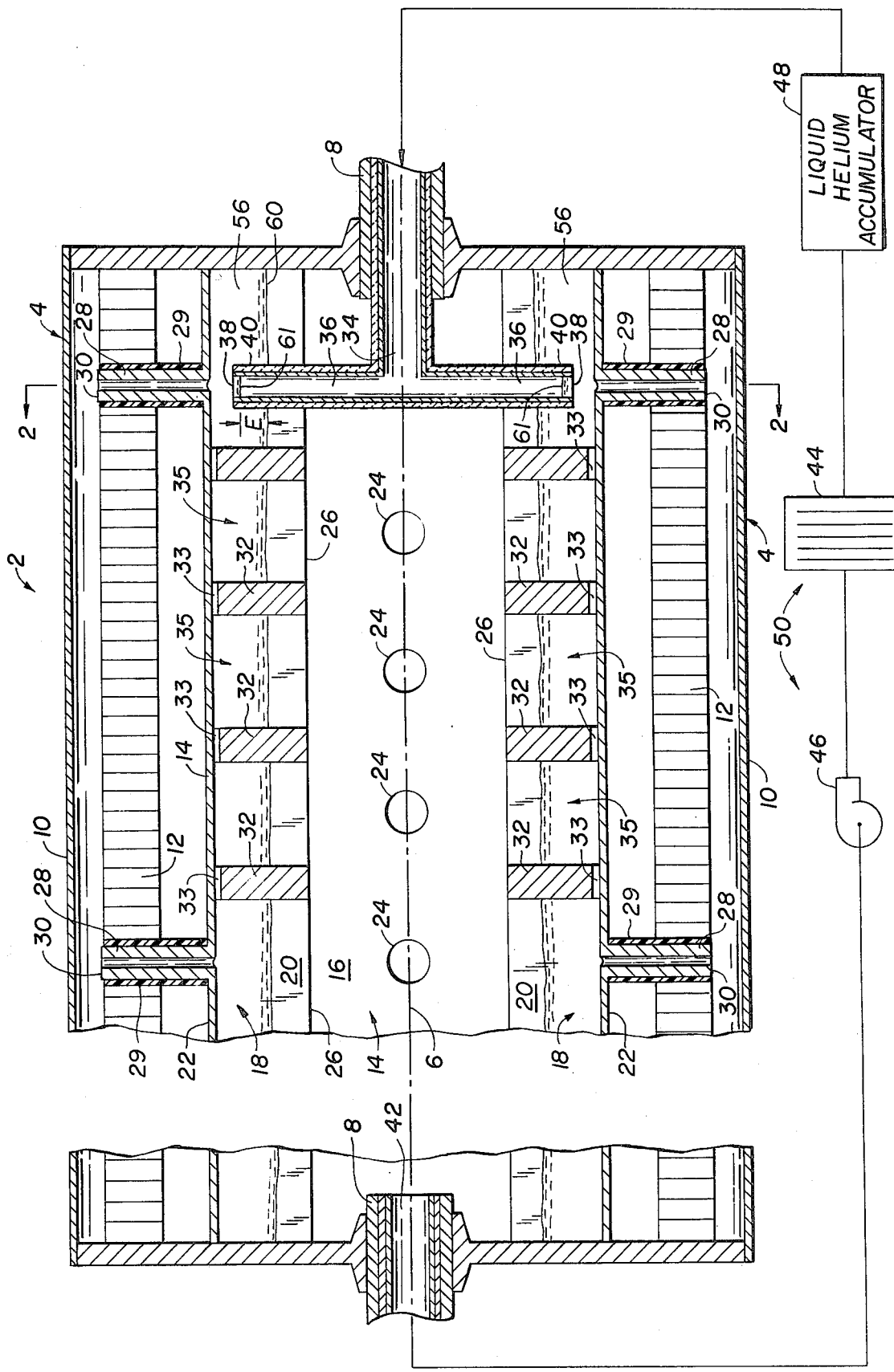
FIG. 1 is a side elevational view, in section, through a generator-rotor for operation in its superconductive state constructed in accordance with the present invention and includes a schematic illustration of the refrigeration system employed by the rotor.

Referring to the drawings, an electric generator/alternator 2 includes a (schematically illustrated rotor 4 that rotates about its axis of rotation 6 within a stator (not separately shown). The rotor has aligned shafts 8 that are journaled in suitable constructed bearings (not separately shown). An outer, gas and liquid impervious shell 10, an annular electrical winding 12 and an inner, gas and liquid pervious cage 14 are mounted to the shaft for coaxial rotation therewith. To facilitate the description and understanding of the present invention the illustrated embodiment shows the shell, the winding and the cage as being somewhat independent of and spaced from each other. In actuality these members are sandwiched together with only small spacings between them. The copending, commonly owned patent application bearing Ser. No. 732,561, filed in the U.S. Patent Office on Oct. 1, 1976, now U.S. Pat. No. 4,092,555 has a more detailed discussion and illustration of the overall construction of a generator for operation in its superconducting mode.

The cage 14 is preferably of a unitary construction and includes two substantially semi-cylindrical sections 16 extending axially over the length of the rotor. Opposing edges of the semi-cylindrical sections are joined by axially extending, inwardly (towards axis 6) open troughs 18. The troughs are relatively narrow, that is they extend over an arc substantially less than 360°, and they have parallel side walls 20 and a bottom 22 interconnecting the radially outermost portions of the side walls. Innermost edges 26 of the side walls are positioned radially inward relative to the semi-cylindrical sections of the cage. The cage also includes a plurality of apertures 24 to render the cage, and in particular the semi-cylindrical sections thereof fluid pervious, that is to permit liquid and gases to flow in a radial direction past the cage.

A plurality of axially spaced apart, heavy walled heat exchanger tubes 28 extend from trough bottom 22 in a radially outward direction and they have free ends 30 proximate to but spaced from the inside of outer shell 10. The heat exchanger tubes extend through the electrical winding 12 of the rotor. Tubular thermal insulators 29, constructed of nylon or another suitable insulation material, are placed over the exterior of heat exchanger tubes 28 to prevent sensible heat of compression produced in the liquid coolant flowing through the tube from being transmitted to the coolant bath in which the winding 12 is submerged. In this manner, sensible heat is conducted by the tubes 28 to cage 14 and results in an increased coolant boil-off from the inner bath surface 54 without "heating" the portion of the bath in which the winding is submerged.

The heat exchanger tubes, the troughs 18 and the semi-cylindrical section 16 of the cage are constructed of a thermally conductive material, such as OFHC copper, and they are thermally coupled such as by integrally constructing them or by suitably welding or brazing them together to effect a high degree to thermal conductivity between them.

A plurality of axially spaced, liquid pervious, baffle walls 32 constructed of a liquid pervious material such as porous bronze are distributed over the length of troughs 18 and suitably secured thereto as by brazing them to the sidewalls 20 of the troughs. The baffle walls prevent the formation of axially travelling liquid waves in the troughs during operation of the rotor. In addition, the baffle walls provide nucleation sites within the liquid coolant pools in the troughs to promote a uniform coolant boiling in the troughs and prevent the formation of local temperature variations. Each baffle wall 32 includes an axially oriented opening such as a slot 33 facing trough bottom 22 and permitting liquid helium to flow into all trough sections 35 formed by the walls.

A liquid helium supply pipe 34 is coaxially disposed within the righthand (as seen in FIG. 1) shaft 8 of the rotor and extends from the exterior to the interior of shell 10. It is fluidly connected to a pair of radially protruding liquid helium supply conduits 36 which rotate with the pipe and the shaft. Free ends 38 of the conduits are disposed in the inwardly opening troughs 18 proximate trough bottoms 22 so that the conduit ends are at all times submerged in a liquid helium pool that forms in the troughs during the operation of the generator. Insulation 40 on the outside of supply pipe 34 and radial conduits 36 prevent thermo-acoustic oscillations and thermal pumping of helium into the troughs during operation of the generator.

The radial conduits have a sufficiently large diameter so that liquid phase bridging does not occur, that is so that there is a central vapor core flow and a surrounding, outer, annular liquid flow in the conduits 36. The radial pressure rise $\Delta p$ then is that of the rotating vapor phase rather than of the rotating liquid phase, namely:

$$\Delta p = \rho_{(v)} \frac{(r_0^2 - r_1^2)\omega^2}{2g_c}$$

for static conditions, wherein $\rho_{(v)}$ is the pressure rise of a vapor column due to centrifugal forces $r_0$ is the outer radius of rotation of conduit 36

$r_1$ is the inner radius of rotation of the conduit 36, or zero, $\omega$ is the angular velocity and $g_c$ is the gravitational constant.

Accordingly, the temperature rise of the liquid helium flowing in conduits due to centrifugal compression is negligible.

The lefthand (as seen in FIG. 1) shaft includes a coaxial helium vapor outlet pipe 42 that is operatively coupled to a compressor 46, a condenser 44 and a liquid helium storage container or accumulator 48 of a refrigeration system 50 for circulation of the helium, first in its gaseous and then in its liquid phase from the center of the rotor through the refrigeration system back to supply pipe 34. For purposes more fully discussed hereinafter the liquid helium accumulator is maintained at atmospheric pressure or it may be pressurized to slightly above atmospheric pressure by well-known means.

Figure 2:
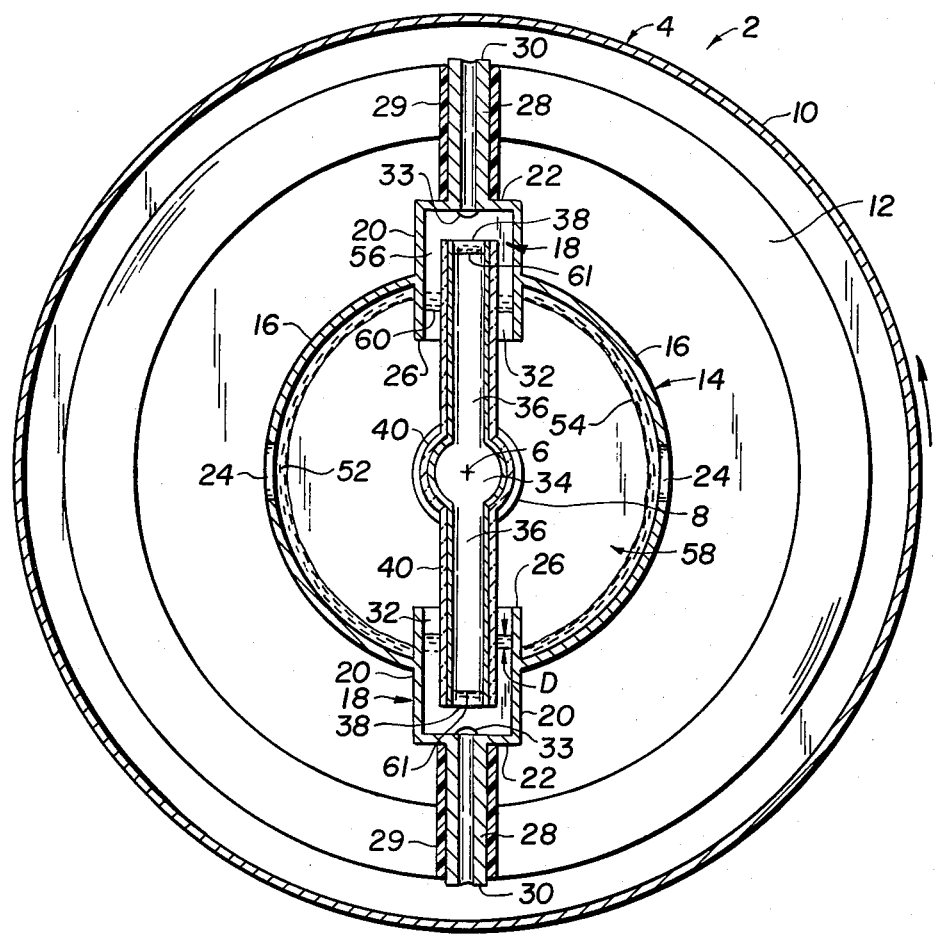
FIG. 2 is a front elevational view, in section, and is taken on line 2—2 of FIG. 1.

Turning now to the operation of rotor 4 in its superconducting state in which the electrical winding 12 is cooled to below its critical temperature, the rotor is rotated at its operating speed, say 3600 rpm. A sufficient quantity of liquid helium is introduced into the interior of shell 10 so that an annular liquid helium bath 52 is formed which submerges the electrical winding 12 as well as cage 14 and which terminates in a cylindrical liquid surface 54 which is radially inward of cage 14 and faces rotor axis 6. The quantity of liquid helium in the rotor is selected so that liquid surface 54 is below, that is radially outward of the axially extending trough edges 26 whereby the trough interrupts the continuity of the cylindrical liquid surface. It is apparent that the formation of the annular liquid helium bath also forms a secondary liquid helium supply pool 56 in troughs 18. During usual operation the level of the pool is slightly above, that is radially inward of the cylindrical bath surface 54 by a distance "D" (FIG. 2) which equals the pressure drop through the electrical winding.

In order to operate the winding well below the critical temperature of between 4.5° to 5° K. (depending on the winding material) the refrigeration system evacuates a vapor core 58 formed and enclosed by cylindrical bath surface 54 to the vapor pressure of helium or to about one-half atmosphere. The cylindrical bath surface is an evaporating interface which cools cage sections 16 and thereby also the thermally coupled trough side walls 20 and tubes 28 to the helium boil-off temperature of about 3.5° K.

Boiled off helium is replenished with liquid helium flowed into troughs 18 from accumulator 48 via supply pipe 34 and radial conduits 36. During the equilibrium operation of the rotor the supply pool level 60 and the cylindrical bath surface 54 remain constant while helium boiled off the bath is replenished with liquid helium from supply pool 56 which streams into the bath via heat exchanger tubes 28. The incoming helium flow rate through conduits 36 is controlled by the differential liquid head "E" (FIG. 1) between the liquid helium pool surface 56 and the vapor pressure rise of rotation 61 in the conduit. When a helium demand surge occurs because more helium is boiled off in bath 52 more helium flows out of pool 56 than is replenished through conduits 36. Pool level 60 drops, thereby reducing the differential head "E" until a balance and equilibrium is re-established.

It should be noted that helium flowing inwardly through supply pipe 34 and radial conduits 36 is a two-phase flow of approximately 92–95% by weight of liquid helium and the balance helium vapor. This translates into an approximately 60% (by volume) liquid and 40% (by volume) vapor helium flow. Since the radial conduits are sufficiently large to prevent liquid phase bridging and since the liquid pool level 60 is at ½ atmosphere, there is the above-discussed negligible temperature rise in the incoming liquid helium which is further compensated by a temperature reduction in the liquid helium flow due to the pressure drop between the atmospheric supply pressure and the ½ atmosphere vapor core pressure at pool level 60. Also, there is a phase separation in trough 18 due to centrifugal forces so that pool 56 is a single, liquid helium phase only pool.

Liquid helium only streams outwardly from pool 56 through tubes 28 and is compressed due to the centrifugal forces acting thereon. This generates sensible heat which is transferred to the heavy walled heat exchanger tubes so that liquid helium exiting from free ends 30 of the tubes is of a temperature only slightly, e.g. 0.1° K. above the helium boiling temperature of 3.5° K. Heat withdrawn from the liquid helium stream in the tubes and transferred to the tubes is conducted by the tubes to troughs 18 and cage sections 16 where the heat is absorbed by the approximately 3.5° K. liquid helium in contact with both sides of the cage sections, and with the exterior sides of the troughs and the tubes. The transferred heat causes an additional helium boil-off at bath interface 52 without affecting, e.g. raising the temperature of the portion of the bath cooling winding 12.

The 3.6° K. liquid helium discharge from tube ends 30 flows generally radially inward past winding 12 towards cage 14. During its inward flow it absorbs heat generated in the winding. It also expands due to the decreasing pressure as it travels radially inwardly. This results in a corresponding temperature reduction which is partially or wholly offset by a temperature increase due to heat absorption from the winding. The effect thereof is that the temperature of the helium normally does not rise appreciably above 3.5° to 3.6° K. and the winding at all times operates well below its critical temperature. A buffer is thereby provided for the ready absorption of sudden heat surges in the winding without permitting the winding temperature to rise above the critical value.

It is apparent that the removal of sensible heat from the liquid helium compressed in tubes 28 requires an additional amount of liquid helium over and above what would be required if the sensible heat were permitted to remain in the helium discharged by the tubes. This additional helium is consumed as an additional helium boil off at bath surface 56. Further, it should be noted that by conducting the withdrawn heat from the tubes 28 via throughs 18 to the cage sections 16 before at least the bulk of such heat is transferred to the helium bath a temperature rise of the bath in contact with the electrical winding and a resulting lesser cooling of the winding is prevented.

I claim:

1. A method of cooling a winding within a rotor having an axis of rotation, a concentric outer, fluid impervious shell, the winding being disposed intermediate the shell and the axis, a liquid coolant intake establishing fluid communication between the interior of the shell and the exterior thereof, and a coolant vapor outlet for removing coolant vapor from the interior of the shell, the method comprising the steps of: rotating the rotor about its axis; forming a liquid coolant bath in contact with the shell and the winding, the bath forming a generally cylindrical, coaxial liquid interface located radially inward of the winding which defines a generally cylindrical, coaxial vapor core for the collection of coolant vapor therein; evacuating coolant vapor from the core; flowing liquid coolant from the intake along a path separated from the bath and extending radially outward into the liquid bath beyond a portion of the winding; withdrawing from the liquid coolant flowing along the path at least a portion of the sensible heat of compression generated by centrifugal forces acting on the liquid in the path; preventing the portion of the withdrawn heat from communicating with a region surrounding the path; conducting the portion of the withdrawn heat to a region of the bath that is radially inward of the winding; and discharging the flowing liquid coolant into the bath at a point radially outward of a portion of the winding.

2. A method of cooling a winding within a rotor having an axis of rotation, a concentric outer, fluid impervious shell, the winding being disposed intermediate the shell and the axis, a liquid coolant intake establishing fluid communication between the interior of the shell and the exterior thereof, and a coolant vapor outlet for removing coolant vapor from the interior of the shell, the method comprising the steps of: rotating the rotor about its axis; forming a liquid coolant bath in contact with the shell and the winding, the bath forming a generally cylindrical, coaxial liquid interface located radially inward of the winding which defines a generally cylindrical, coaxial vapor core for the collection of coolant vapor therein; evacuating coolant vapor from the core; flowing a stream of liquid coolant from the intake along a path separated from the bath and extending radially outward into the liquid bath beyond a portion of the winding; communicating a portion of the path intermediate the intake and the winding with the vapor core to remove vapor inclusions from the stream of liquid coolant; and discharging the flowing liquid coolant into the bath at a point radially outward of a portion of the winding.

3. A method according to claim 2 wherein the step of communicating said portion of the path includes the steps of dividing the liquid bath into a relatively large volume bath and a relatively small volume pool communicating with the core, and including the steps of flowing liquid coolant from the intake into the pool, and thereafter flowing liquid coolant from the pool in a radially outward direction into the bath.

4. A method according to claim 3 including the step of withdrawing sensible heat of compression from the liquid coolant flowing from the pool into the bath before such coolant reaches the bath.

5. A method of operating a rotor in its superconducting state, the rotor having an axis of rotation, a concentric, fluid impervious outer shell, and a concentric electrical winding disposed interiorly of the shell, the method comprising the steps of: placing a quantity of liquid coolant into the shell and rotating the rotor at a sufficient rate to distribute the coolant in an annular liquid coolant bath over the interior of the shell and to fully submerge the winding in the bath while forming an interior vapor core into which coolant can boil off; flowing a liquid coolant into the interior of the shell and forming therewith at least one liquid coolant intake pool that has a radially innermost surface in contact with the vapor core, that extends over at least a substantial portion of the length of the shell, that occupies an arc of substantially less than 360 degrees, and that is radially spaced inward of the shell; flowing at least one liquid stream from the intake pool in a radially outward direction past the winding towards the shell to thereby compress the liquid in the stream; discharging the stream into the liquid bath radially adjacent the shell; withdrawing from a portion of the stream radially outward of a portion of the winding sensible heat before the liquid stream is discharged into the bath; preventing the withdrawn heat from communicating with a region surrounding the stream; flowing liquid coolant discharged by the stream through the winding toward the vapor core to thereby cool the winding with the liquid coolant; collecting coolant vapor in the vapor core; and withdrawing coolant vapor from the core; whereby sensible heat of compression is withdrawn from the liquid coolant stream before the stream is discharged into coolant bath to thereby lower the temperature of the bath radially outward of the electrical winding.

6. A method according to claim 5 including the steps of providing a radially extending conduit through which the stream flows, thermally coupling the conduit with a portion of the bath radially inward of the winding, and withdrawing the sensible heat from the stream through the conduit to the portion of the bath.

7. A method according to claim 5 including the steps of providing a radially extending conduit through which the stream flows, thermally coupling the conduit with a member disposed radially inward of the winding and submerged in the bath, and conducting the withdrawn heat from the conduit via the member to a portion of the bath relatively proximate the vapor core.

8. A method according to claim 5 including the steps of forming a vacuum in the vapor core, and supplying fresh liquid coolant at a pressure no less than atmospheric pressure to prevent the inclusion of atmospheric air in the liquid coolant path and resulting coolant path blockages.

9. A method according to claim 8 including the step of pressurizing liquid coolant entering the rotor to above atmospheric pressure.

10. A method according to claim 5 including the step of circulating coolant vapor withdrawn from the core through a compressor and a condenser and thereafter recirculating the liquid coolant to the intake pool.

11. A method according to claim 10 wherein the step of recirculating includes the step of directing the liquid coolant to a coolant accumulator disposed upstream of the intake pool, and flowing fresh liquid coolant from the coolant accumulator to the intake pool.

12. A method according to claim 11 including the step of flowing the liquid coolant into the intake bath along an unobstructed, uncontrolled supply passage.

13. A method according to claim 13 wherein the distance between the axis of rotation and the liquid level in the intake pool differs from the spacing between the axis of rotation and the liquid level in the bath.

14. A method according to claim 5 including the steps of flowing the liquid coolant through a closed conduit into the shell interior, and discharging liquid coolant from the conduit into the liquid coolant intake pool at a point radially outward of the liquid level of the intake pool.

15. A method according to claim 14 including the steps of forming the intake pool so that its volume is substantially less than the volume of the bath; and maintaining the pressure on the liquid coolant flow into the shell interior constant irrespective of variations in the coolant demand, whereby changes in the coolant demand are compensated by changes in the liquid level of the intake pool and resulting changes in the flow rate of liquid coolant entering the pool caused by variations in the liquid level of the pool.

16. A method according to claim 15 wherein the liquid coolant flowing into the shell interior includes entrained coolant vapor, and including the step of forming a coolant flow in the closed conduit of a sufficiently large cross-section to prevent liquid bridging and form an inner coolant vapor flow and a surrounding, annular liquid coolant flow in the conduit.

17. In an internally cooled rotor having a generally cylindrical outer shell concentric with an axis of rotation, a winding disposed interiorly of the shell for rotation therewith, a liquid coolant intake and a coolant vapor outlet, and a sufficient quantity of liquid coolant so that it forms an annular coolant bath submerging the winding when the rotor is rotated at its operating speed and an inner, substantially concentric vapor-filled core space surrounded by the bath, the core being in fluid communication with the coolant outlet, the improvement to the coolant intake comprising: a liquid coolant supply pipe extending from the exterior to the core space; conduit means coupling the coolant supply pipe to a first region of the bath radially outward of a portion of the winding for flowing a stream of coolant radially outwardly from the pipe separate from the bath and for discharging the stream into the first region of the bath; heat transfer means thermally coupling a portion of the outwardly flowing stream to a second region of the bath radially inward of the winding for withdrawing a portion of heat of compression from the liquid coolant stream and for conducting the heat to the second region; heat insulation means for preventing the portion of heat withdrawn from communicating with the bath proximate the winding; the conduit means including a portion in fluid communication with the core for removing from the coolant stream coolant vapor inclusions before the liquid coolant is discharged into the first region of the bath.

18. A rotor according to claim 17 wherein the conduit means extends radially outward to adjacent the shell for the discharge of the liquid coolant from the conduit at a point radially proximate the shell.

19. A rotor according to claim 17 wherein the vapor removal means, the conduit means, and the heat transfer means together comprise first and second, spaced apart conduit sections, means establishing fluid communication between the sections, and means separating liquid coolant between the sections from the liquid coolant bath.

20. A rotor according to claim 19 wherein the separating means comprises an axially extending trough having an open side facing the axis of rotation of the rotor, an exterior of a wall of the trough being in contact with the bath, an interior of the trough receiving liquid coolant from the first conduit section so as to define a pool of liquid coolant, the second conduit section being in fluid communication with the trough interior and having an intake end submerged in the coolant pool so that the stream of liquid coolant passes from the first section via the trough interior to the second section while being kept separate of the liquid coolant bath.

21. A rotor according to claim 20 wherein the second conduit section comprises a tubular member constructed of a heat conducting material, and wherein the trough and the tubular member are thermally coupled, whereby sensible heat of compression generated in liquid coolant flowing through the tubular member is transferred to the tubular member for transmission to the trough and hence to the liquid bath to effect a further cooling of liquid coolant discharged from the tubular member and expanding in the bath.

22. A rotor according to claim 19 including thermal insulation on the first conduit section to prevent thermal-acoustic oscillations and thermal pumping of the liquid coolant therein.

23. A rotor according to claim 21 in which the heat transfer means also includes an inner, coolant pervious cage constructed of a thermally conducting material, thermally coupled to the trough for rotation therewith, and wholly positioned within the liquid coolant bath, whereby coolant discharged from the second conduit section flows past the member to be cooled and the coolant pervious cage for evaporation therefrom into and withdrawal from the core space.

24. A superconducting generator comprising in combination:
an electrical winding carried by a rotatable shaft, a fluid impervious shell surrounding the winding; and a fluid pervious cage disposed interiorly of the winding, all connected with the shaft for synchronized rotation therewith;
a plurality of spaced apart, longitudinally extending fluid impervious, inwardly opening troughs thermally coupled with the cage for rotation therewith, the troughs having longitudinal sidewalls which project inwardly past the cage;
a quantity of liquid coolant disposed within the shell, the quantity being measured so that it wholly submerges the cage and partially submerges the troughs in a liquid coolant bath but does not reach an innermost end of the trough sidewalls when the shaft is rotated at normal operating speed;
a plurality of radially oriented heat exchanger tubes constructed of a thermally conducting material, extending radially from and in fluid communication with an interior side of the trough and thermally coupled with the trough, the tubes terminating at a point proximate but spaced from the shell, the tubes being connected to the trough at a point submerged in liquid coolant during operation of the generator;
a liquid coolant supply pipe coaxially extending from an interior of the cage to the exterior thereof;
a lateral liquid coolant supply conduit in fluid communication with the pipe and disposed interiorly of the shell for flowing liquid coolant from the pipe to each trough, the conduit having an end disposed inside the trough a sufficient distance so that the end is submerged in liquid coolant at all times during the operation of the generator; and
a refrigeration system for withdrawing coolant vapor from the interior of the shell, condensing the vapor and recirculating the liquid coolant to the liquid coolant supply pipe;
whereby during the operation of the generator liquid coolant flows from the trough through the tubes into the bath and sensible heat of compression due to the rotation of the generator generated in coolant flowing through the tubes is at least in part withdrawn therefrom and transferred via the tube, the trough and the cage to the coolant bath so that the temperature of the liquid coolant discharged from the tubes into the bath is reduced to effect a greater cooling of the electrical winding as the coolant flows past it.

25. Apparatus according to claim 24 including means for supplying liquid coolant to the supply pipe at a constant pressure so that variations in the coolant demand are self-regulated by corresponding variations in the depth of the liquid pool in the trough and corresponding variations in the flow rate through the supply pipe and supply conduits.

26. Apparatus according to claim 24 wherein the refrigeration means includes means for forming a vacuum interiorly of the liquid bath, and means for supplying liquid coolant to the supply pipe at a pressure no less than atmospheric pressure to prevent the inclusion of foreign gaseous substances in the coolant supply and a resulting blockage of the coolant flow.

27. Apparatus according to claim 24 wherein the refrigeration means includes a condensor and a liquid coolant reservoir interposed between the condensor and the liquid coolant supply pipe so that sudden surges in the coolant demand can be supplied from the accumulator.

28. Apparatus according to claim 20 including means for maintaining the liquid coolant in the accumulator at about atmospheric pressure.

29. Apparatus according to claim 24 wherein the coolant comprises helium, and wherein the temperature of the coolant in a space between the shell and the electrical winding is less than about 4.5° K.

30. Apparatus according to claim 29 wherein the temperature of the coolant in the last mentioned space is about 3.6° K.

31. Apparatus according to claim 24 wherein the refrigeration system includes means for maintaining the space interior of the liquid bath at a pressure of no more than about one-half atmosphere.

32. Apparatus according to claim 17 including a coolant pervious baffle wall disposed in each trough for inhibiting the formation of axially travelling coolant waves in the troughs.

33. Apparatus according to claim 32 including a plurality of axially spaced baffle walls in each trough.

34. Apparatus according to claim 32 including an aperture through the baffle wall positioned to be submerged in the pool to enable the flow of liquid coolant past the baffle wall.

* * * * *